Feb. 27, 1940.  C. W. SHAW  2,191,944
SELF-LOCKING VALVE TAPPET SCREW
Filed April 29, 1937
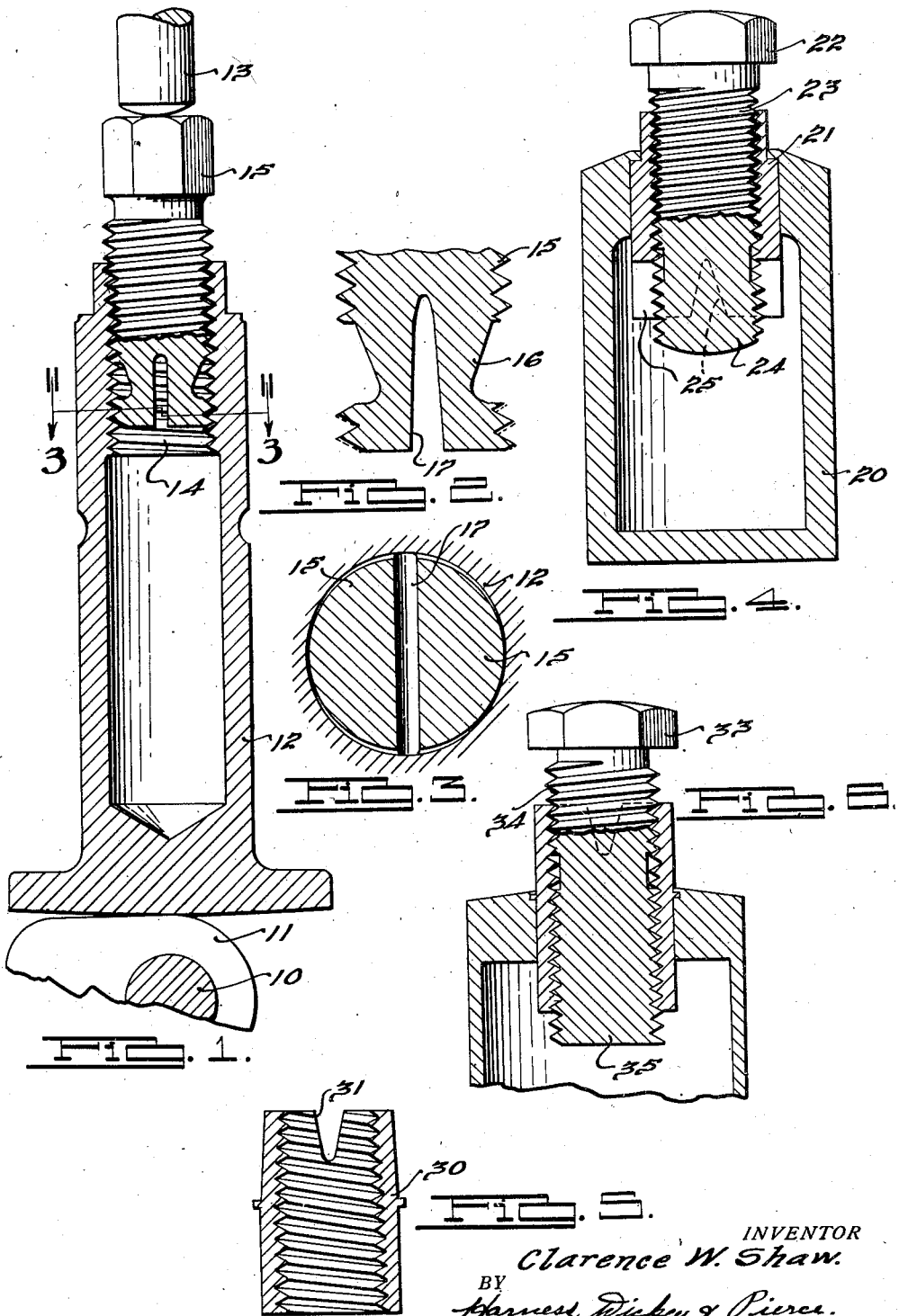
INVENTOR
Clarence W. Shaw.
BY
Harness, Dickey & Pierce.
ATTORNEYS.

Patented Feb. 27, 1940

2,191,944

UNITED STATES PATENT OFFICE 2,191,944

SELF-LOCKING VALVE TAPPET SCREW

Clarence W. Shaw, Grosse Pointe, Mich., assignor to Eaton Manufacturing Company, Cleveland, Ohio, a corporation of Ohio Application April 29, 1937, Serial No. 139,776

2 Claims. (Cl. 151—22)

This invention relates to self-locking screws of the type primarily utilized as adjusting studs in valve tappets. More particularly it relates to a novel and improved type of screw which is constructed in such a manner that the necessity of a lock nut conventionally used in connection with adjusting studs in tappets is entirely eliminated.

The self-locking screw of the present invention is designed as an improvement over screws of the type disclosed in the Dyer United States Patent Reissue No. 20,542, issued October 26, 1937, and assigned to the assignee of the present invention.

The improved screw of the present invention comprises a polygonal head portion integrally formed on a substantially cylindrical shank. The shank of the screw is externally threaded and has a portion thereof axially spaced from the end of the shank formed of reduced diameter. This reduced diameter portion is preferably substantially frusto-conical having a point of minimum diameter adjacent the end of the shank. In addition, the screw is provided with an axially extending diametrically disposed slot extending from the axial end of the screw throughout the length of the threaded end section and throughout the length of the reduced diameter portion thereof. This construction provides portions interconnecting the main portion of the shank with the segmental portions constituting the spaced threaded section thereof of scientifically designed spring section, thus virtually eliminating the possibility of fracture during use.

The screw is preferably manufactured by externally threading the entire shank screw in such a manner that the threads of both sections thereof will have substantially the same lead. After the completion of this threading operation, one face of the thread on the lower section is relieved to reduce the pitch diameter of this thread without substantially altering the configuration of the thread structure. This cutting away of the threads serves not only the purpose of reducing the pitch diameter of this threaded section but serves to displace the lead of the thread axially.

After the screw has been threaded and slotted, the lower threaded section is expanded in order that it will have a maximum diameter substantially equal to the maximum diameter of the body portion of the shank.

When this screw has been heat treated to harden the same, it may be screwed into the internally threaded opening of a tappet or other member with which it is associated and the threads of the lower threaded section will be sufficiently accurate to mate with the threads formed on the interior of the aperture. As the threads of the main portion of the shank engage the threads of the aperture, a partial collapse of the slotted threaded section of the screw will result due to the axial offset of the thread lead effected by the cutting away and expanding of the threads of the lower section. This radial collapse of the slotted threaded section will be resiliently resisted by the spring section serving to interconnect the two threaded sections of the screw and consequently, will very greatly resist turning movements of the screw within the aperture.

The resistance to collapse of the spring section will determine the torsional resistance of the screw and this may be controlled by the shape of the spring section, the depth of the slot, or the amount the lower threaded section has been expanded. It should be noted that, due to the relieved face of the lower threaded section, this thread face will not contact the adjacent thread face of the female threaded member; therefore, all the radial force of the collapsed spring section will be exerted between the upper thread face of the lower threaded section, and the lower thread face of the female threaded member. Due to the angle (usually 30°) of the thread faces, a tension will be developed between the upper and lower threaded sections of the externally threaded member, tending to draw the threads of the upper threaded section down onto the upper thread faces of the female threaded member, resulting in a frictional resistance between these thread faces and, at the same time, pre-loading these threads in the same direction as the force which they are intended to carry in opening an engine valve. An additional torsional resistance is also developed by reason of the frictional resistance on the upper thread faces of the lower threaded member against the lower threaded faces of the female threaded member.

The present invention is designed as an improvement over the structure disclosed in the Dyer patent referred to above and is designed to oversome certain of the structural defects found in the Dyer structure which rendered the screw of Dyer considerably less satisfactory from a commercial standpoint than the screw of the present invention. It will be apparent that as the screw is threaded into an interiorly threaded aperture, the axial offset of the leads of the threaded sections tends to effect a partial collapse of one of the threaded sections and this collapse is permitted in the slotted threaded section due to the slot therein. In order to prevent binding of the screw and provide substantially uniform torque resistance, it is essential that some clearance must be provided to permit the threads of the slotted section to ride upon the mating threads of the internally threaded member. In the structure of Dyer, it is possible that binding of the screw with respect to the threads of the internally threaded member will result, unless the screw is provided with two axially extending slots disposed at substantially 90° angles with respect to each other. If two slots are utilized, the inherent cross sectional configuration of the portions interconnecting the spaced threaded sections of the screw provides a spring section in many respects unsatisfactory for commercial use.

In order to obtain a more complete understanding of certain of the salient objects, advantages and features of the present invention reference may be had to applicant's assignee's copending application, Serial Number 138,292. This copending application relates to a self locking screw construction which is adapted for utilization in substantially the same manner as the screw of the present invention. In the Hoern application the peripheral surface of the screw adjacent the openings of the slot is cut away in order to provide clearance so that binding will not occur when the threads of the screw ride up upon the threads of the internally threaded aperture in which the screw is fitted. It will be appreciated that in the construction disclosed in this case the necessity for providing the flats adjacent the openings of the slot is not present due to the fact that the slotted section of the screw has been relieved so that its diameter, when measured in a direction parallel to the slot, is smaller than the diameter of the internally threaded member which it is adapted to engage. Consequently when the screw is threaded into an aperture, bearing will take place at points approximately 90° from the openings of the slot and the zone of bearing will increase in magnitude as the threads ride up upon threads of the internally threaded member. When the screw is in full locking position, substantially uniform bearing will be had throughout the entire surface of the threads of the screw and the threads of the members into which the screw has been threaded, thus providing a locking effect dependent upon the frictional resistance of the screw to turning rather than a binding of the threads.

It will be noted that the base of this spring section, the point at which maximum load is necessarily absorbed, is extremely narrow and consequently, renders the spring section extremely liable to fracture during the shocks and strains encountered during use of the device.

It is a primary object of the present invention to provide a self-locking screw having two axially spaced integrally interconnected threaded sections, one of the sections having the threads thereof of slightly reduced pitch diameter and said last mentioned section being slotted axially and expanded in order that the over-all diameter of this threaded section will be substantially the same as the main body portion of the screw.

Many other and further objects, advantages, and features of the present invention will become clearly apparent when considered in connection with the following specification and the drawing forming a part thereof.

In the drawing:

Figure 1 is a vertical sectional view through a valve tappet illustrating the self-locking screw of the present invention installed in position therein.

Fig. 2 is an enlarged fragmentary sectional view of the lower end of the adjusting screw 5 illustrating in detail the manner in which the same is constructed.

Fig. 3 is a transverse sectional view taken substantially on the line 3—3 of Fig. 1 showing the improved self-locking screw threaded into a tappet or similar structure.

Fig. 4 is a vertical sectional view through a modified form of tappet illustrating a modified means for locking a screw in position therein.

Fig. 5 is a vertical sectional view through a locking sleeve adapted for securing a screw in position internally thereof.

Fig. 6 is a vertical sectional view through the upper portion of a tappet body illustrating the sleeve structure shown in Fig. 5 seated in position therein and an adjusting screw threadably received by said sleeve.

While it will be apparent from the following description that the self-locking screws disclosed herein are illustrated and described in connection with valve tappets, it will be readily apparent that they will find broad and practical utility in many other fields.

The structure shown in Fig. 1 includes a cam shaft 10 having a plurality of cams 11 thereon, one of which is clearly illustrated. As is conventional in constructions of this general character, a tappet 12 is mounted to ride upon the cam 11 and transmit the motion thereof to a valve stem or push rod. This tappet may be of any suitable structure as is conventional in constructions of this general character, but in any event is provided at its upper end with an internally threaded, axially extending bore 14 adapted to receive an adjusting screw 15 which adjusting screw is utilized to accurately control the clearance between the base of the valve stem and the head of the screw in order that the valve will properly and tightly seat and yet at the same time will respond to movement of the cam 11.

Due to the fact that these adjusting screws are subjected to considerable hammering and very severe shocks and strains during ordinary normal usage, it is essential that the screw be sufficiently rugged to withstand strains imposed upon it and yet at the same time maintain its predetermined adjusted position with respect to the valve tappet in order that once an adjustment has been made, the adjustment will be permanently maintained until re-adjustment is necessary or desirable.

In order to achieve this end, the screw of the present invention is manufactured in accordance with the following described novel method. The entire body portion of the screw beneath the head is provided with a thread of a pitch adapted to mate with the internally threaded bore 14 of the valve tappet. After the threading operation has been completed, the exterior surface of the screw is turned down or relieved to provide a reduced diameter portion 16 interconnecting the spaced threaded sections thus interrupting the thread formed exteriorly on the surface of the screw. This relieved or reduced diameter portion 16 is of generally frusto-conical form having a maximum diameter substantially equal to the root diameter of the threads at the point where it connects with the main portion of the screw and a minimum diameter adjacent the point where it connects with the threaded end portion of the screw. The shape of this interconnecting portion is an extremely important feature of the present invention as will hereinafter be more fully appreciated.

After the screw has been formed in this manner, it is provided with an axially extending slot 17 extending from the axial end of the screw throughout not only the lower threaded section thereof but throughout the length of the reduced diameter portion and terminating adjacent the end of this reduced diameter portion. A more detailed description of the nature of this slot is found below.

Preferably prior to the formation of the slot 17, one flank of the thread of the lower threaded portion of the screw is relieved or cut away in substantially the manner indicated by the dotted lines in Fig. 2. This relief of the thread at this point serves two important purposes. In the first place, it serves to reduce the pitch diameter of the lower threaded section of the screw and at the same time serves to offset the lead and thread of the screw axially with respect to the lead of the thread of the main body of the tappet. After the screw has been slotted, the portions forming the lower threaded section of the screw are spread apart slightly and the screw as a whole may then be heat treated. The head of the screw, due to the extremely severe shocks to which it is exposed, is preferably heat treated to a considerably greater hardness than is the threaded portion but it is desirable that the threaded portion be heat treated to a hardness of between 35 and 42 Rockwell C scale. Prior to this heat treatment, as explained above, the lower or slotted portion of the screw is spread in order that the maximum diameter thereof will be substantially the same as or greater than the maximum diameter of the shank portion of the screw. Consequently, it will be seen that as the screw is threaded into the tappet in the manner shown in Fig. 1 of the drawing, the portions forming the lower threaded section will be readily received by the threads prior to the entry of the threads on the body portion of the shank of the screw. When the threads on the body portion of the shank of the screw enter the internally threaded bore 14, considerable resistance to turning movements will be encountered due to the axial displacement of the lead of the thread of one of the threaded sections with respect to the lead of the other of the threaded sections arising from the spreading of the flanks of the thread on the lower threaded section. As a result of the axial offset of these thread leads, the portions of the screw which together make up the lower threaded section will inherently be moved radially toward each other inasmuch as it is necessary that the threads on the surface thereof ride up on the threads of the internally threaded bore in order to permit proper mating of the threads of the main shank with the internally threaded bore. The portions of the screw which interconnect the two threaded sections and which constitute the reduced diameter portion 16 have been cut away in such a manner that an extremely low rate but yet resilient spring section resists the radial inward movement of the portions of the screw making up the lower threaded section. Due to the fact that this spring section which interconnects each of these with the main shank of the screw is generally tapering, it is uniformly stressed and thus provides a construction which has extremely long life.

It has been found preferable to form the slot 17 of sufficient depth so that the forces urging the portions of the screw making up the lower threaded section radially inwardly are insufficient to deform the screw as a whole beyond its elastic limit, however, it will be readily appreciated that as the depth of the slot is decreased, the screw may be deformed beyond its elastic limit and in such event it will conform itself to the operating conditions desired, whereby the elastic limit will also represent the limit of turning resistance. It will, therefore, be readily appreciated that the depth of this slot may accurately be used to control the resistance which the screw has to turning movements and, consequently, varied resistances will be obtained in particular instances as may be desired.

As is clearly seen by reference to Fig. 3 of the drawings, the relieving of the lower threaded sections serves to reduce the diameter thereof in order that as the lower end of the screw is expanded to have an over-all diameter about the same as that of the main shank portion, a slight clearance for the threads on the portion of the screw forming the lower threaded section thereof will be formed between the surface of these threads and the adjacent surface of the threads of the internal bore 14, consequently, permitting free radial movement of the portions of the lower threaded section as the shank of the screw is threadably received within the bore.

In Fig. 4 of the drawing, a modified form of the invention is disclosed in which a valve tappet body 20 is provided with an axial bore on its upper end adapted to receive an internally threaded collar 21. In this form of the invention, an adjusting screw 22 is provided which has the shank thereof relieved and externally threaded to provide spaced threaded sections 23 and 24. In this form of the invention, the threads of the lower threaded section may be chamfered in the manner described above in order to axially offset the lead thereof with respect to the lead of the threaded section 23. This chamfering will, of course, inherently slightly reduce the pitch diameter of the threaded section 24. The lower end of the collar 21 which is internally threaded throughout its entire axial length is provided with a pair of axially extending slots 25 and after it has been slotted, is deformed to reduce the internal diameter of the slotted rear end thereof in order that the projecting portions formed at the lower end will be urged radially outwardly as a result of the offset leads of the threaded section of the screw when the screw is screwed therein. In Figs. 5 and 6, a still further modified form of the invention is disclosed in which an internally threaded collar 30 has axially extending slots 31 formed in the upper end thereof and this collar is extremely compressed in order to reduce the diameter of the slotted portion. Consequently, when a screw 33 having axially spaced integrally connected threaded sections 34 and 35 is threadably received therein, the offset leads of the sections 34 and 35 will serve to expand the collar and provide the necessary locking action in substantially the same manner as has been outlined above.

In both of these forms of the invention, it is usually desirable to heat treat the collars 21 and 30 in order that they will have substantial hardness and resilience in order to provide a uniform torque resistance to turning movements of the screws as the same are threaded therein.

While several specific forms of the invention have been illustrated herein and described above, it will be readily appreciated that many other and various forms of the invention falling within the scope thereof as defined in the subjoined claims will be apparent to those skilled in the art.

What is claimed is:

1. A self locking screw having a shank formed to provide a pair of axially spaced threaded portions, the lead of the thread of one of said portions being offset axially with respect to the lead of the thread of the other of said portions, the thread of one of said threaded portions having a slightly smaller pitch diameter than the thread of the other of said portions, said one portion having a slot extending axially thereof and extending from one end of the screw throughout the said threaded portion and throughout the portion of said screw shank interconnecting said threaded portions.

2. A self-locking screw having a pair of integrally connected axially spaced threaded sections, the lead of the thread of one of said sections being offset axially with respect to the lead of the thread of the other of said sections, one of said sections being formed with an axially disposed slot therein and expanded to provide a structure generally oval in cross-section.

CLARENCE W. SHAW.